3,497,416
HEAT SEALABLE POLYETHER-URETHANE
FOAM LAMINATES
Frank E. Critchfield, South Charleston, and Robert D.
Whitman, St. Albans, W. Va., assignors to Union Carbide Corporation, a corporation of New York
No Drawing. Filed Sept. 16, 1965, Ser. No. 487,903
Int. Cl. B32b 27/40, 27/30, 31/36
U.S. Cl. 161—190                                        8 Claims

ABSTRACT OF THE DISCLOSURE

Laminates are prepared by heat sealing a flexible urethane foam to a substrate. The flexible urethane foam comprises the reaction product of a polyether polyol and a polyisocyanate prepared by reacting dipropylene glycol or dibutylene glycol with an excess of an aromatic polyisocyanate. The laminates are useful as padding and insulation such as clothing interliners.

---

The invention relates to laminates of a substrate and polyether-urethane foam, and particularly to such laminates that are produced by heat sealing. More particularly, the invention relates to urethane foam laminates wherein the urethane foam is the reaction product of a polyether polyol and a particular organic polyisocyanate, fully described below.

In U.S. Patent No. 3,205,120 (J. C. Flanders), there are described heat sealed urethane foam laminates that are prepared from polyether-based urethane foam. The invention described in the Flanders patent was important in that it provided, for the first time, a urethane foam laminate produced by the heat sealing technique wherein the urethane foam was derived from a polyether polyol rather than from the more expensive polyester polyol. The essence of the Flanders invention was that there was included in an otherwise conventional commercial polyether flexible urethane foam reaction mixture a minor amount of a polyol having a low molecular weight (i.e. 200 to 1500). The preferred low molecular weight polyol was tris(dipropylene glycol) phosphite. Other low molecular weight polyols disclosed by Flanders include alkylene oxide adducts of polyhydroxyalkanes, phosphorus-containing acids, and the like.

The laminates produced from Flanders' polyether urethane foam are roughly equivalent in properties to those that are produced from the commercially established polyester urethane foams. However, there are processing difficulties encountered in the production of the Flanders polyether urethane foam that stem from the high reactivity of the polyether polyol mixture. These difficulties at least partially cancel the cost advantage of the polyether-based foam with the result that there has been no great incentive for laminate producers to switch from polyester to polyether foams. The Flanders invention has therefore gained only limited commercial acceptance.

The present invention is based upon the discovery that urethane foam laminates having outstanding properties can be produced by heat sealing a substrate to a particular urethane foam, fully described below. The laminates that are produced in accordance with the invention have an overall balance of properties that is superior to the polyester foam laminates that have been commercially available, and the novel laminates have the added advantage that they are produced from polyether-based urethane foam rather than from the more expensive polyester-based urethane foam. The urethane foams that are employed in the invention are produced by reacting a polyether polyol with an organic polyisocyanate, wherein the organic polyisocyanate employed is the reaction product of an aromatic polyisocyanate and dipropylene glycol or dibutylene glycol. Accordingly, the invention comprises the use, in the production of heat sealed urethane foam laminates, of a urethane foam that is produced by reacting, in the presence of a foaming agent, a polyether polyol with the reaction product of an aromatic polyisocyanate and dipropylene glycol or dibutylene glycol.

The urethane foams that are employed in the production of the laminate of the invention are produced by reacting a polyether polyol with the organic polyisocyanate in the presence of a blowing agent. The polyether polyols employed are alkylene oxide adducts of compounds that contain two or more, usually from two to three, reactive hydrogens. Such compounds are referred to in the art as "starters," and are usually amines, alcohols, aminoalcohols, or water. Examples of useful starters include water, ethylene glycol, diethylene glycol, propylene glycol, dipropylene glycol, butylene glycols, glycerol, 1,2,6-hexanetriol, 1,2,4-butanetriol, 1,1,1-trimethylolethane, 1,1,1-trimethylolpropane, methylamine, ethylamine, diethanolamine, diisopropanolamine, triethanolamine, triisopropanolamine, aniline, pentaerythritol, and others. Preferred starters include water, alkanediols such as propylene glycol, alkanetriols such a glycerol, dialkylene glycols such as diethylene glycol and dipropylene glycol, and the like.

The alkylene oxides employed to produce the polyether polyols are normally those that contain from two to four carbon atoms such as ethylene oxide, propylene oxide (1,2-epoxypropane), 1,2-butylene oxide, 2,3-butylene oxide, isobutylene oxide, tetrahydrofuran, and the like. Propylene oxide and mixtures of propylene oxide with ethylene oxide are preferred.

The polyether polyols are produced by reacting the starter with alkylene oxide in the presence of a catalyst such as potassium hydroxide. The proportions of the reactants is adjusted so that the polyether polyol will have a hydroxyl number in the desired range to produce flexible urethane foams. As is well known in the art, the hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where:

OH = hydroxyl number of the polyol
$f$ = average functionality, that is, average number of hydroxyl groups per molecule of polyol.
M.W. = average molecular weight of the polyol.

The polyether polyol, which can be a mixture of two or more polyols as well as one polyol, preferably has a hydroxyl number in the range of from about 40 to about 80, and more preferably in the range of from about 45 to about 70. Hydroxyl numbers within these ranges are preferred for the production of flexible urethane foams. The polyether polyol will normally have an average molecular weight in excess of about 2000 up to about 4500 or more.

The major point of novelty of the invention resides in the organic polyisocyanate that is employed to produce the urethane foam. The polyisocyanate is the reaction product of an excess of an aromatic polyisocyanate with a diol, said diol being dipropylene glycol, dibutylene glycol, or a mixture of both. The aromatic polyisocyanate is preferably a diisocyanate, although small amounts of tri- and higher polyisocyanates can be employed in mixtures with a major amount of diisocyanate. The aromatic polyisocyanates which can be employed include tolylene diisocyanates including 2,4- and 2,6-tolylene diisocyanates and mixtures thereof, phenylene diisocyanates, xylene diisocyanates, and the like. The tolylene diisocyanates are preferred.

The preferred method for producing the organic polyisocyanate used in the invention is to slowly add the diol to the aromatic polyisocyanate, thereby maintaining at all times an excess of isocyanato to hydroxyl groups. The temperature of the reaction can be varied over a wide range, for instance, from about 20° C., and lower, to about 100° C., and higher. The preferred reaction temperature is in the range of from about 25° C. to about 80° C. The reaction time depends, in part, upon factors such as temperature, nature and proportion of the reactants, and the like. For instance, the diol addition time can be from about 1 hr. to about 5 hrs., and the addition can be followed by a subsequent reaction period which can be from about one-half hour to about six hours. One desirable method for producing the organic polyisocyanate is to slowly add the diol to the aromatic polyisocyanate with the reactants being at about room temperature (i.e., about 25° C.), and to allow the reaction mixture to rise to about 80° C. The reaction is then maintained at about 80° C. for a period of about two hours, and is then cooled to room temperature.

The molar ratio of aromatic polyisocyanate:diol is at least 2:1 and as high as about 6:1. Preferred molar ratios of aromatic polyisocyanate:diol are found in the range of from about 3:1 to about 5:1. While higher ratios than 6:1 can be employed, if desired, the beneficial effect begins to diminish as less diol is employed. At ratios close to 2:1, the viscosity of the polyisocyanate becomes very high which makes processing difficult.

The aromatic polyisocyanate-diol reaction products contain both isocyanato and urethane groups. Since reaction between the isocyanato and the hydrogens in the urethane groups can occur, it is desirable to stabilize the reaction product. Benzoyl chloride has been found to be an excellent stabilizer, although other stabilizers known to the art can be employed if desired. The stabilizer is employed in amounts sufficient to substantially inhibit the reaction of isocyanato with urethane hydrogen. Excessive amounts of stabilizer are preferably avoided so that it will be unnecessary to employ relatively large amounts of catalyst during the foaming reaction. Stabilizer concentrations of from about 0.02 weight percent to about 1 weight percent can be used. Preferred concentrations of stabilizer are in the range of from about 0.05 to about 0.15 weight percent. Percentages are based upon weight of aromatic polyisocyanate-diol reaction product.

The urethane foams of the invention are produced by reacting the polyether polyol with the organic polyisocyanate in the presence of a blowing agent. The organic polyisocyanate is usually employed in a stoichiometric excess with respect to the reactive hydrogens contributed to the foam formulation from the polyether polyol and any water that is present. A five to ten percent excess of isocyanato over reactive hydrogens is frequently employed, although other ratios can be employed if desired.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and mixtures of water with certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, 1,1-dichloro-1-fluoroethane, 1,1-difluoro-1,2,2-trichloroethane, 1,1,2-trichloro-1,2,2-trifluoroethane, 1,1,1-trichloro-2,2,2-trifluoroethane and the like. Other useful blowing agents include low boiling hydrocarbons such as pentane, hexane, and the like. Many other compounds easily volatilized by the exotherm of the isocyanate-reactive hydrogen reaction also can be employed. A further class of blowing agents includes thermally unstable compounds which liberate gases upon heating, such as N,N'-dimethyl-dinitrosoterephthalamide.

The amount of blowing agent used will vary with the density desired in the foamed product. In general, it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts are preferably employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N,N,N'N'-tetramethyl-1,3 - butanediamine, 1,4-diazabicyclo - [2,2,2]octane, bis[2 - (N,N - dimethylamino)-ethyl]ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate. The catalyst is employed in catalytic amounts such as from about 0.05 weight percent to about 3 weight percent, based on weight of the polyether polyol.

In the production of urethane foams, it is useful in most cases to employ a surfactant. Polysiloxane-polyoxyalkylene block copolymers are examples of such useful surfactants. Among the polysiloxane-polyoxyalkylene block copolymers that are useful are those that are disclosed in U.S. Patents 2,843,748 and 2,917,480 (Bailey et al.) and 2,846,458 (Haluska). The surfactant is normally employed in amounts of from about 0.01 to about 2 weight percent, based on weight of polyol.

In many cases, it will be desirable to include a small amount of dipolar aprotic solvent in the foam reaction mixture. Such solvents include N,N-dimethylformamide and dimethyl sulfoxide. The solvent acts to extend the useful range of foaming catalyst concentration so that the concentration above which closed cells occurs is not critically close to the concentration below which foam collapse occurs. Up to about 10 weight percent of dipolar aprotic solvent (based on weight of polyether polyol) is usually sufficient for this purpose.

An excellent summary of urethane polymer chemistry and technology which may be helpful in practicing the invention is found in the text by Saunders and Frisch, "Polyurethanes: Chemistry and Technology," Interscience Publishers, New York. Part I, "Chemistry," was published in 1963 and Part II, "Technology," in 1964.

The laminates of the invention comprise at least one layer of urethane foam which has been heat sealed to at least one layer of a substrate. The substrates which can be employed include spun, woven, knitted, felted, matted, and the like, textile fabrics produced from natural and synthetic fibers such as cotton, wool, silk, linen, jute, hemp, sisal, nylon, polyester, polyacrylonitrile, vinyl chloride-acrylonitrile copolymer, rayon, polyurethane spandex, and the like. Other useful substrates include plastic film prepared from poly(vinyl chloride), vinyl chloride-vinyl acetate copolymers, vinylidene chloride homopolymers and copolymers, cellophane, polyethylene, polypropylene, polystyrene, and the like. Still further useful substrates include wood, glass, metal, stone, cement, various plastics, plastic foam, and the like. The preferred substrates include fabrics and films produced from vinyl chloride polymers (both homopolymers and copolymers).

The laminates of the invention are produced by heating part or all of the surface of the urethane foam described above to a temperature above the fusion temperature of the foam to form a tacky liquid or semi-liquid layer, and thereafter or concurrently with the heating operation, applying the substrate to the tacky surface of the foam and holding in contact therewith while cooling until the surface cools and resolidifies, thereby forming an adhesive bond between the foam and the substrate. The fusion temperature of the foam will vary depending upon the nature and proportion of the components therein, but in general is in the range of from about 400° F. to about 600° F. It is in general desirable not to heat the surface of the foam to a temperature higher than about 100° F. above the fusion temperature of the particular foam. In keeping the substrate in contact with the tacky surface of the foam until said surface has cooled and resolidified, it is desirable to employ a moderate amount of pressure in order to maintain the foam and substrate in contact. The pressure can be as low as that resulting from the weight of the foam or the substrate, but is preferably of the order of from about 0.1 to about 100 or more pounds per square inch. The heat can be applied to the surface of the foam by any convenient means, for example, a flame, dielectric heating, a hot surface such as a "hot plate" and the like.

One particularly desirable feature of the invention is that there is provided for the first time a urethane foam (of any sort, including polyester-based urethane foam) that can be heat sealed to vinyl chloride polymer films by dielectric heating. The resulting urethane foam-vinyl chloride polymer film laminates are highly useful in the preparation of preformed cushioning for furniture, automobile seats, crash pads, and the like.

The several types of laminates that are provided by the invention are widely useful. For instance, the fabric-urethane foam laminates are useful in the production of padded clothing, insulation, cushions, and the like. The laminates provided by the invention are generally widely useful in the production of cushioning, heat and sound insulation, crash pads and the like.

The examples which follow illustrate the invention.

EXAMPLE 1

The organic polyisocyanate employed in the examples was produced by the following procedure:

Dipropylene glycol was reacted with tolylene diisocyanate (TDI) in a molar ratio of TDI:diol of 4:1. The dipropylene glycol (100.6 pounds) was slowly added to the tolylene diisocyanate (522.5 pounds heated to 65° C.) over a period of 3.5 hours. The reaction temperature was permitted to rise from about 65° C. to about 80° C. during the addition of the dipropylene glycol. The reaction mixture was maintained at 80° C. for 3 hours after the addition and was then cooled to room temperature. The final product was a liquid that had a Brookfield viscosity of 350 centipoises at 25° C.

EXAMPLE 2

A urethane foam was produced by the one shot technique from the following formulation:

| | Parts by weight |
|---|---|
| Polyol A[1] | 100 |
| Stannous octoate | 0.3 |
| Dimethylformamide | 5.0 |
| Bis[2-(N,N-dimethylamino)ethyl]ether[2] | 0.5 |
| Water | 4.0 |
| Emulsifier A[3] | 2.0 |
| Polyisocyanate of Example 1 | 78.0 |

[1] A polyol produced by first reacting propylene oxide with a mixture of (a) 90 parts by weight of an adduct formed by reacting three moles of propylene oxide with glycerol and (b) 10 parts by weight of dipropylene glycol to obtain a polyol having a hydroxyl number of 51, and then adding ethylene oxide to form a polyol having a hydroxyl number of 48.
[2] A 70 weight percent solution in diethylene glycol.
[3] A siloxane-oxyalkylene block copolymer of the formula:

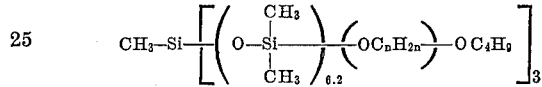

wherein the ($OC_nH_{2n}$) moiety represents a mixed polyoxyethylene-polyoxypropylene group having an average of about 18 oxyethylene groups and about 14 oxypropylene groups.

The above-described urethane foam was flame laminated to nylon tricot fabric by conventional procedures on a commercial-type flame laminating machine. The resulting fabric-foam laminates were evaluated by the test procedures described below. The test specimens measured 1 inch x 6 inches.

Test methods (1) Dry peel strength: The force in ounces per inch necessary to separate the foam from the cloth. (Tear strength tested on an Instron tester.)

(2) Dry cleaning solvent—Wet peel strength: Six test specimens are placed in a one-pint glass bottle containing the following solution:

| Component: | Parts by weight |
|---|---|
| R. R. Street and Co., Inc., Formula 886 Soap | 3 |
| Tap water | 6 |
| Perchloroethylene | 91 |

The container is then mechanically shaken for ten minutes. The specimens are removed and rinsed in 100 percent perchloroethylene. The samples are then placed between paper towels to remove the excess liquid. The peel strength is then determined with three specimens while wet.

(3) Dry cleaning solvent—Dry peel strength: The other three specimens are dried at room temperature for 24 hours and the peel strength determined.

(4) Laundered—Wet peel strength: Six test specimens are immersed in a 1-liter solution at 160° F. in a 2-liter container. The solution has the following composition: 1 percent by weight Ivory Flakes, and 99 percent by weight tap water.

The specimens are gently stirred for 10 minutes. The specimens are then removed and rinsed in lukewarm water. The specimens are then placed between paper towels to remove the excess liquid. Three specimens are run wet to determine the wet peel strength.

(5) Laundered—Dry peel strength: Three of the above specimens are dried at room temperature for 24 hours and the peel strengths determined.

The results of the evaluation are displayed in Table I, which also shows the values obtained for nylon tricot-polyester urethane foam laminates.

TABLE I.—PEEL STRENGTH BEFORE AND AFTER DRY CLEANING AND LAUNDERING

| | Foam Laminated to Nylon Fabric | |
|---|---|---|
| | Foam of Example 2 | Commercial Polyester Foam |
| 1. Control Peel Strength: | | |
| (a) Length, ounces/inch | 16.3 | 7.3 |
| (b) Width, ounces/inch | 19.0 | 5.7 |
| 2. Dry Cleaned-Wet Peel Strength: | | |
| (a) Length, ounces/inch | 4.7 | 2.0 |
| (b) Width, ounces/inch | 5.2 | 1.9 |
| 3. Dry Cleaned-Dry Peel Strength: | | |
| (a) Length, ounces/inch | 16.3 | 5.6 |
| (b) Width, ounces/inch | 13.8 | 5.9 |
| 4. Laundered-Wet Peel Strength: | | |
| (a) Length, ounces/inch | 5.6 | 1.4 |
| (b) Width, ounces/inch | 5.8 | 1.4 |
| 5. Laundered-Dry Peel Strength: | | |
| (a) Length, ounces/inch | 16.0 | 5.4 |
| (b) Width, ounces/inch | 14.1 | 5.6 |

The foam-fabric bond strengths of the laminates of the invention are from two to three times greater than the bond strengths of the polyester-based laminates heretofore available.

EXAMPLE 3

The polyether urethane foam described above in Example 2 is heat sealed to a plasticized poly(vinyl chloride) film by a commercial dielectric heater. The resulting laminate has excellent bond strength between the foam and the film.

What is claimed is:

1. In a process for producing a laminated structure which comprises heat sealing a substrate to a urethane foam, said urethane foam being produced by reacting a polyether polyol with an organic polyisocyanate in the presence of a blowing agent, the improvement which comprises employing as the organic polyisocyanate the reaction product of an excess of an aromatic polyisocyanate with a diol selected from the group consisting of dipropylene glycol and dibutylene glycol.

2. The process of claim 1 wherein said aromatic polyisocyanate is an aromatic diisocyanate.

3. The process of claim 1 wherein said aromatic polyisocyanate is tolylene diisocyanate.

4. The process of claim 1 wherein said diol is dipropylene glycol.

5. The process of claim 1 wherein said aromatic polyisocyanate is tolylene diisocyanate and wherein said diol is dipropylene glycol.

6. The process of claim 1 wherein said substrate is a fabric.

7. The process of claim 1 wherein said substrate is a vinyl chloride polymer film.

8. The laminate produced by the process of claim 1.

References Cited

UNITED STATES PATENTS

| 2,843,568 | 7/1958 | Benning et al. | 260—77.5 |
| 2,929,800 | 3/1960 | Hill | 260—77.5 |
| 3,049,516 | 8/1962 | Damusis | 260—77.5 |
| 3,072,582 | 1/1963 | Frost | 260—2.5 |
| 3,164,572 | 1/1965 | Axelrod | 260—77.5 |
| 3,205,120 | 7/1965 | Flanders | 161—160 |
| 3,131,105 | 4/1964 | Codos | 156—82 |
| 3,318,744 | 5/1967 | Hurley | 156—82 |
| 3,368,932 | 2/1968 | Weill et al. | 156—82 XR |

JOHN T. GOOLKASIAN, Primary Examiner

D. J. FRITSCH, Assistant Examiner

U.S. Cl. X.R.

161—256, 227; 156—306; 260—2.5, 77.5